US012734681B2

(12) United States Patent
Okushima

(10) Patent No.: US 12,734,681 B2
(45) Date of Patent: Sep. 15, 2026

(54) FULCRUM OPENING/CLOSING TYPE AIR

(71) Applicant: SMC CORPORATION, Tokyo (JP)

(72) Inventor: Ryosuke Okushima, Moriya (JP)

(73) Assignee: SMC CORPORATION, Tokyo (JP)

( * ) Notice: Subject to any disclaimer, the term of this patent is extended or adjusted under 35 U.S.C. 154(b) by 943 days.

(21) Appl. No.: 18/049,062

(22) Filed: Oct. 24, 2022

(65) Prior Publication Data

US 2023/0150123 A1 May 18, 2023

(30) Foreign Application Priority Data

Nov. 18, 2021 (JP) ................................ 2021-187797

(51) Int. Cl.
*B25J 9/14* (2006.01)
*B25J 15/02* (2006.01)

(52) U.S. Cl.
CPC .......... *B25J 9/146* (2013.01); *B25J 15/0206* (2013.01)

(58) Field of Classification Search
CPC ..... B25J 9/146; B25J 15/0206; G01N 27/409; E04D 13/00
See application file for complete search history.

(56) References Cited

U.S. PATENT DOCUMENTS

| | | | |
|---|---|---|---|
| 5,904,358 A | 5/1999 | Hosono et al. | |
| 2020/0130069 A1* | 4/2020 | Ishikawa .................. | B25B 1/24 |
| 2020/0340940 A1* | 10/2020 | Furuta ................. | G01N 27/409 |

FOREIGN PATENT DOCUMENTS

| | | | |
|---|---|---|---|
| JP | 10-080888 A | 3/1998 | |
| JP | 2009-119597 A | 6/2009 | |
| JP | 2013-67445 A | 4/2013 | |
| KR | 20180085892 A * | 7/2018 | ............ E04D 13/00 |
| WO | WO 2011/030576 A1 | 3/2011 | |

OTHER PUBLICATIONS

English translation of KR 20180085892 (Year: 2018).*
Japanese Office Action issued May 7, 2025 in Japanese Patent Application No. 2021-187797 (with unedited computer-generated English translation), 10 pages.
Japanese Notice of Reasons for Refusal issued Jan. 21, 2025 in Japanese Patent Application No. 2021-187797 with English translation, 10 pgs.

* cited by examiner

*Primary Examiner* — Gene O Crawford
*Assistant Examiner* — Sydney Jeanine Simmons
(74) *Attorney, Agent, or Firm* — Oblon, McClelland, Maier & Neustadt, L.L.P.

(57) ABSTRACT

A fulcrum opening/closing type air chuck includes porous bodies that are attached to a body and come into contact with fingers, and purge air passes through the porous bodies and is discharged to the outside.

7 Claims, 11 Drawing Sheets

FULCRUM OPENING/CLOSING TYPE AIR

CROSS-REFERENCE TO RELATED APPLICATIONS

This application is based upon and claims the benefit of priority from Japanese Patent Application No. 2021-187797 filed on Nov. 18, 2021, the contents of which are incorporated herein by reference.

BACKGROUND OF THE INVENTION

Field of the Invention

The present invention relates to a fulcrum opening/closing type air chuck including a pair of pivoting gripping members, and more particularly to a fulcrum opening/closing type air chuck having a dust-proof function.

Description of the Related Art

Conventionally, there has been known a fulcrum opening/closing type air chuck that grips a workpiece using a pair of gripping members that pivot about axes. For example, JP H10-080888 A discloses a chuck device in which a pair of gripping members pivotably supported on a body are driven by a cylinder mechanism.

In the chuck device disclosed in JP H10-080888 A, a cover member is attached to one end portion of a body to prevent dust from entering the interior of the body. Specifically, a first curved portion provided on the pivoting portion of each gripping member is brought into contact with the corner portion of the body, and a second curved portion provided on the pivoting portion of the gripping member is brought into contact with the recess of the cover member.

SUMMARY OF THE INVENTION

However, in order to bring the pivoting portions of the gripping members into contact with the body and the cover member with substantially no gap, the dimensional accuracy of each member must be extremely high. Further, if it is attempted to bring them into contact with each other with no gap, the sliding resistance when the gripping members pivot becomes large.

As an anti-dust measure, a rubber dust cover covering the outer side of the gripping members may be attached to the body. However, unlike the gripping members of the parallel opening/closing type air chuck in which the gripping members are slid, the gripping members of the fulcrum opening/closing type air chuck have a large movable range. For this reason, in order to prevent the dust cover from coming into contact with the gripping members and being torn, a large dust cover is required, and the apparatus becomes large.

As another anti-dust measure, a rubber sealing member such as a gasket may be disposed between the gripping members and the body. However, when a rubber sealing member is used, the sliding resistance when the gripping members pivot becomes large.

The present invention has the object of solving the aforementioned problems.

The present invention is a fulcrum opening/closing type air chuck in which a pair of fingers are each supported so as to be pivotable about a pivot support shaft attached to a body, and a drive unit configured to drive the pair of fingers to move away from each other and approach each other is disposed inside the body. The fulcrum opening/closing type air chuck includes a porous body attached to the body and configured to come into contact with the fingers, and purge air passes through the porous body and is discharged to outside.

The fulcrum opening/closing type air chuck according to the present invention is provided with the porous body that is attached to the body and comes into contact with the fingers, and the purge air passes through the porous body and is discharged to the outside. Therefore, dust can be prevented from entering the interior of the body without increasing the sliding resistance of the fingers.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
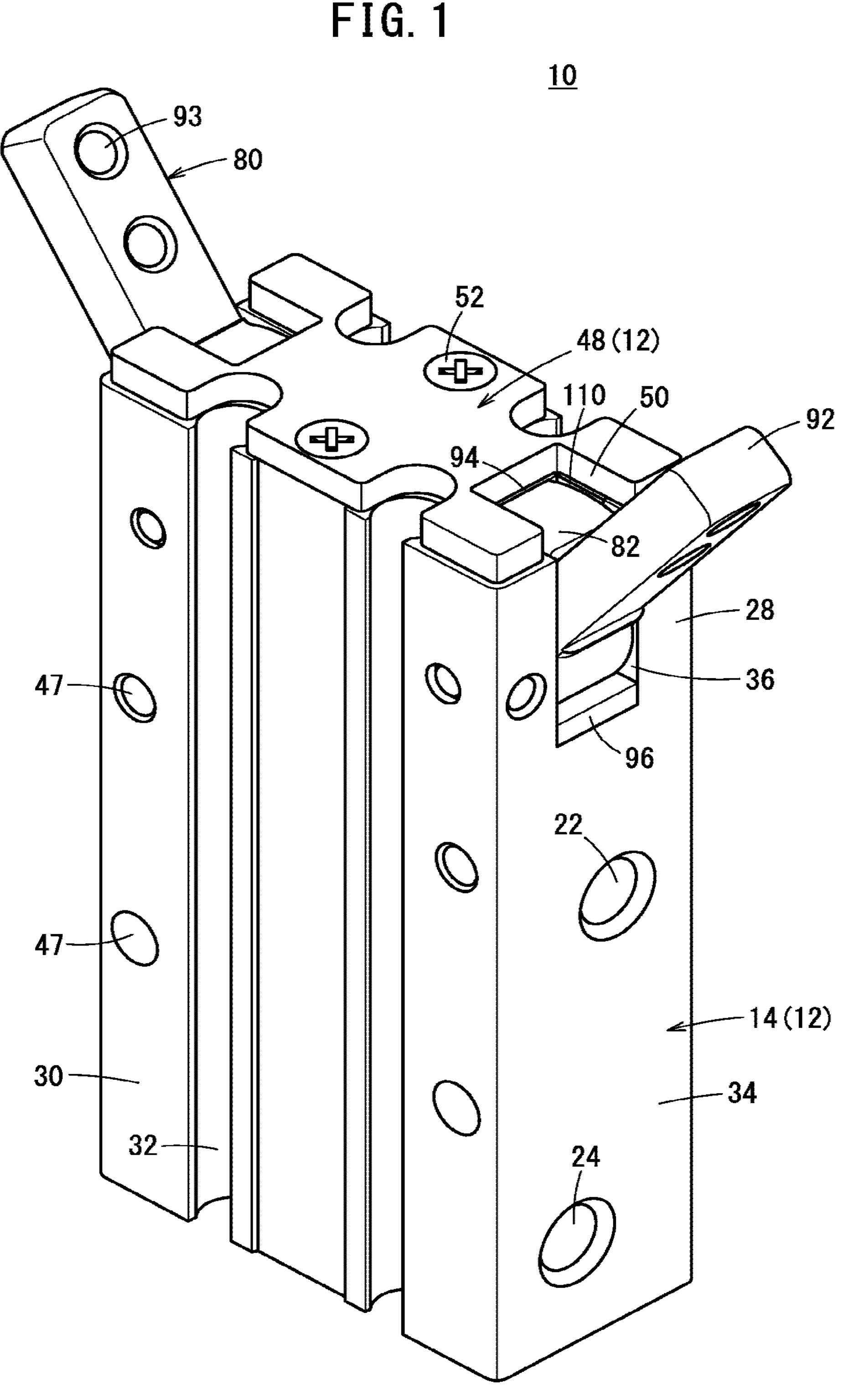
FIG. 1 is a perspective view of a fulcrum opening/closing type air chuck according to an embodiment of the present invention.
Figure 2:
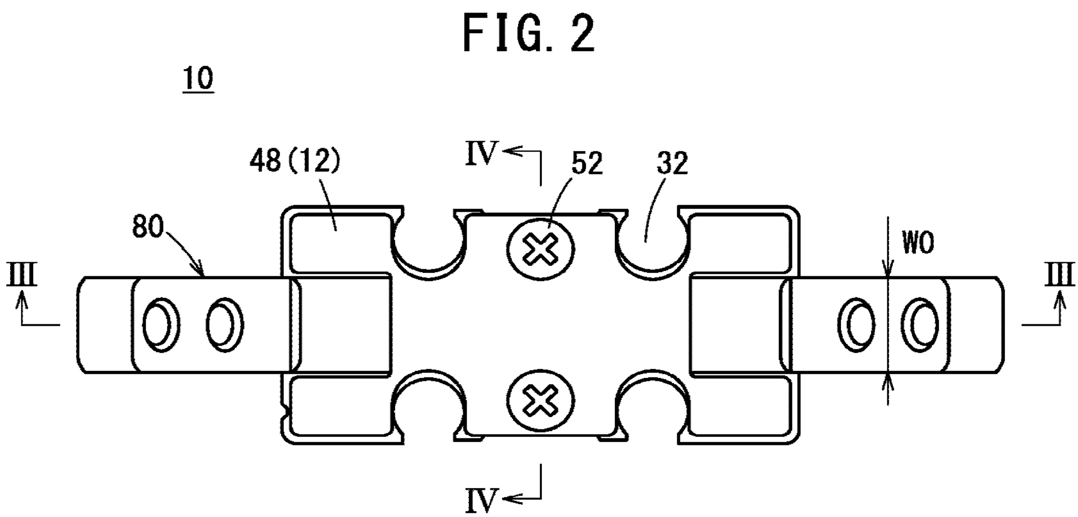
FIG. 2 is a plan view of the fulcrum opening/closing type air chuck shown in FIG. 1.

As shown in FIGS. 1 to 4, a fulcrum opening/closing type air chuck 10 according to an embodiment of the present invention includes a body 12, a pair of fingers 80, a drive unit 58, and first to third porous bodies 94, 96, and 110. The pair of fingers 80 are pivotably supported on the body 12. The drive unit 58 includes a piston 60 and a drive rod 70 integrally coupled to the piston 60, and is disposed inside the body 12. The pair of fingers 80 are driven to move away from each other and approach each other by the drive unit 58. In the following description, when terms in relation to up and down directions are used, for the sake of convenience, such terms refer to the directions shown in FIG. 3. However, the actual arrangement of the constituent members and the like is not necessarily limited to this feature.

The body 12 includes a main body 14 and an end plate 48. The end plate 48 is attached to the upper end of the main body 14 by screw members 52. The main body 14 having a quadrangular prism shape includes a cylinder hole 16 therein, and the piston 60 is slidably disposed in the cylinder hole 16. The lower end of the cylinder hole 16 is closed by a cap 54. A cylinder chamber formed by the cylinder hole 16 is partitioned into a first pressure chamber 18 located above the piston 60, and a second pressure chamber 20 located below the piston 60. The main body 14 is provided with a first port 22 for supplying/discharging air to/from the first pressure chamber 18, and a second port 24 for supplying/discharging air to/from the second pressure chamber 20.

The main body 14 is cut out parallel to wide side surfaces 30 from one of a pair of narrow side surfaces 34 to the other thereof above the cylinder hole 16. That is, the main body 14 includes a pair of side walls 28 above the cylinder hole 16. Reference numeral 47 denotes attachment holes for attaching the body 12 to a conveying device (not shown) or the like.

A piston packing 62, magnets 64, and a wear ring 66 are mounted to the outer peripheral portion of the piston 60. The piston packing 62 provides a seal between the first pressure chamber 18 and the second pressure chamber 20. The wide side surfaces 30 of the main body 14 have sensor grooves 32. The magnetic flux of the magnets 64 can be detected by magnetic sensors (not shown) attached to the sensor grooves 32. A damper 68 is attached to the upper end of the piston 60. The damper 68 absorbs an impact when the piston 60 moves to an upper end position.

The drive rod 70 is inserted into a bush 72 mounted to the cylinder hole 16, and is supported so as to be movable up and down. A rod packing 74 in sliding contact with the drive rod 70 is mounted to the upper end of the cylinder hole 16. The rod packing 74 airtightly holds the first pressure chamber 18. A sealing member 56 for keeping the second pressure chamber 20 airtight from the outside is mounted to the outer peripheral portion of the cap 54. The drive rod 70 extends upward from the cylinder hole 16. The upper end of drive rod 70 is provided with a pair of arm portions 76 directed toward the respective fingers 80. A cylindrical rolling element 78 is rotatably supported at the distal end of each arm portion 76.

Each finger 80 is formed of a fan-shaped pivoting portion 82 and an elongated gripping portion 92. The pivoting portion 82 and the gripping portion 92 have a constant width W0. The pivoting portion 82 is disposed between the pair of side walls 28 of the main body 14. A pivot support shaft 40 is mounted across the pair of side walls 28 of the main body 14, and the pivot support shaft 40 is inserted into a bush 88 mounted to the center of the pivoting portion 82. As a result, the fingers 80 are supported so as to be pivotable about the pivot support shafts 40.

The pivoting portions 82 each include a first curved surface 84 facing the end plate 48, and a second curved surface 86 facing a fitting recess 42 of the main body 14 described later. The first curved surface 84 and the second curved surface 86 each have a constant radius of curvature about the axis of the pivot support shaft 40. The radius of curvature of the first curved surface 84 is greater than the radius of curvature of the second curved surface 86. Further, the pivoting portion 82 has two end surfaces facing the side walls 28 of the main body 14. The end surfaces of the pivoting portion 82 are perpendicular to the axis of the pivot support shaft 40. The gripping portions 92 each extend radially outward from one circumferential end portion of the first curved surface 84 of each of the pivoting portions 82.

The pivoting portions 82 each include a groove portion 90 extending to a predetermined depth from another circumferential end portion of the first curved surface 84. The rolling elements 78 supported by the arm portions 76 of the drive rod 70 are disposed in the groove portions 90 of the pivoting portions 82, and can move in the groove portions 90 while rolling. As a result, the vertical linear motion of the drive rod 70 is converted into the pivot motion of the fingers 80. When the drive rod 70 moves upward, the pair of fingers 80 pivot in a direction in which the pair of gripping portions 92 move away from each other, and when the drive rod 70 moves downward, the pair of fingers 80 pivot in a direction in which the pair of gripping portions 92 approach each other.

The end plate 48 includes, at both ends thereof, cutout portions 50 to be passages of the gripping portions 92 when the fingers 80 pivot. The narrow side surfaces 34 of the main body 14 each have an opening 36 that opens between the pair of side walls 28. The pivoting portions 82 of the fingers 80 and the first to third porous bodies 94, 96, and 110 prevent the interior of the body 12 from being directly connected to the outside through the openings 36 of the main body 14 and the cutout portions 50 of the end plate 48. That is, a purge air storage space 38 isolated from the outside is formed above the cylinder hole 16.

The first to third porous bodies 94, 96, 110 are each formed of a lubricant retainer that is a fiber composite. However, the first to third porous bodies 94, 96, and 110 are not impregnated with a lubricant. The first to third porous bodies 94, 96, and 110 cannot prevent fine dust from entering the interior by themselves due to the nature of having voids therein. However, by performing air purging described later, it is possible to prevent fine dust from entering from the outside.

The first to third porous bodies 94, 96, and 110 that come into contact with the fingers 80 have small deformation resistance and are easily deformed. Even if the first to third porous bodies 94, 96, and 110 are brought into contact with the fingers 80 at a predetermined pressure in order to reliably fill the gap between the first to third porous bodies 94, 96, and 110 and the fingers 80, resistance (sliding resistance) when the fingers 80 move is small. In the present embodiment, the first to third porous bodies 94, 96, and 110 are formed of lubricant retainers, but may be formed of felt or sponge.

Figure 5:
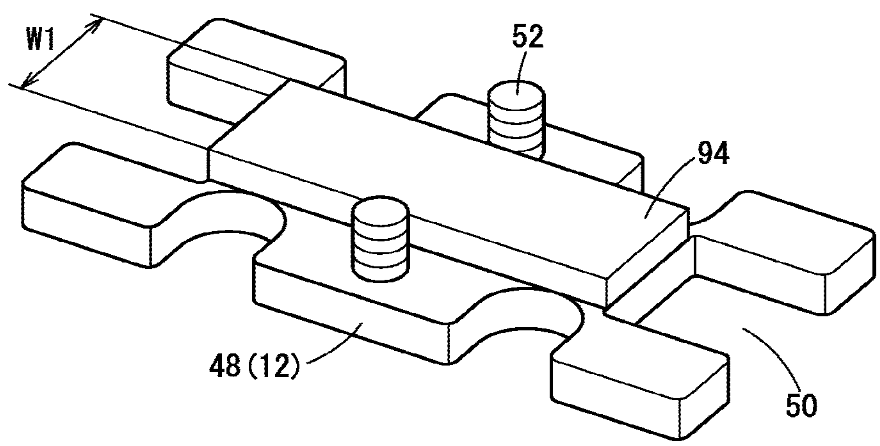
FIG. 5 is a view showing a state in which a first porous body of the fulcrum opening/closing type air chuck shown in FIG. 1 is attached.

As shown in FIG. 5, the first porous body 94 is formed in an elongated rectangular plate shape having a constant width W1. The first porous body 94 is attached to the lower surface of the end plate 48 using, for example, an adhesive. The width W1 of the first porous body 94 is equal to or slightly larger than the width W0 of the pivoting portions 82 of the fingers 80. In the entire pivot range of the fingers 80, the first curved surface 84 of the pivoting portion 82 of each of the fingers 80 comes into contact with the end portion of the first porous body 94 in the lengthwise direction (see FIG. 3). A portion of the first porous body 94 that comes into contact with the first curved surface 84 is deformed by being pressed by the first curved surface 84.

Figure 6:
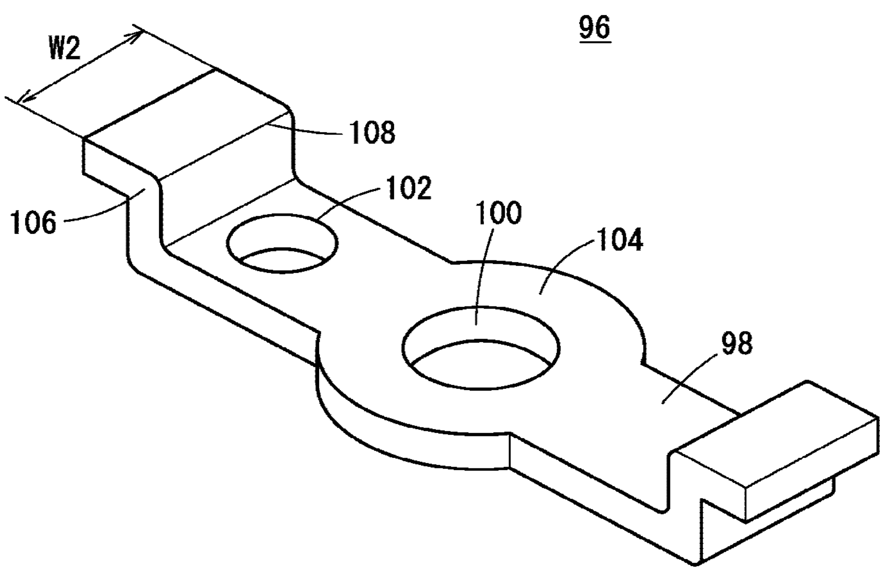
FIG. 6 is a perspective view of a second porous body of the fulcrum opening/closing type air chuck shown in FIG. 1.

As shown in FIG. 6, the second porous body 96 includes an elongated plate-shaped base portion 98, and a pair of stepped portions 106 bent in an L-shape from both ends of the base portion 98. The base portion 98 is provided with, at the center thereof in the lengthwise direction, a first hole portion 100 through which the drive rod 70 is inserted. Further, the base portion 98 is provided with, at one end portion thereof in the lengthwise direction, a second hole portion 102 serving as a passage of purge air. The base portion 98 is provided with a pair of projecting portions 104 projecting from the vicinity of the first hole portion 100 to both sides. In a state before the drive rod 70 is inserted into the first hole portion 100, the inner diameter of the first hole portion 100 is smaller than the outer diameter of the drive rod 70. In other words, when the drive rod 70 is inserted into the first hole portion 100, the first hole portion 100 expands.

Figure 3:
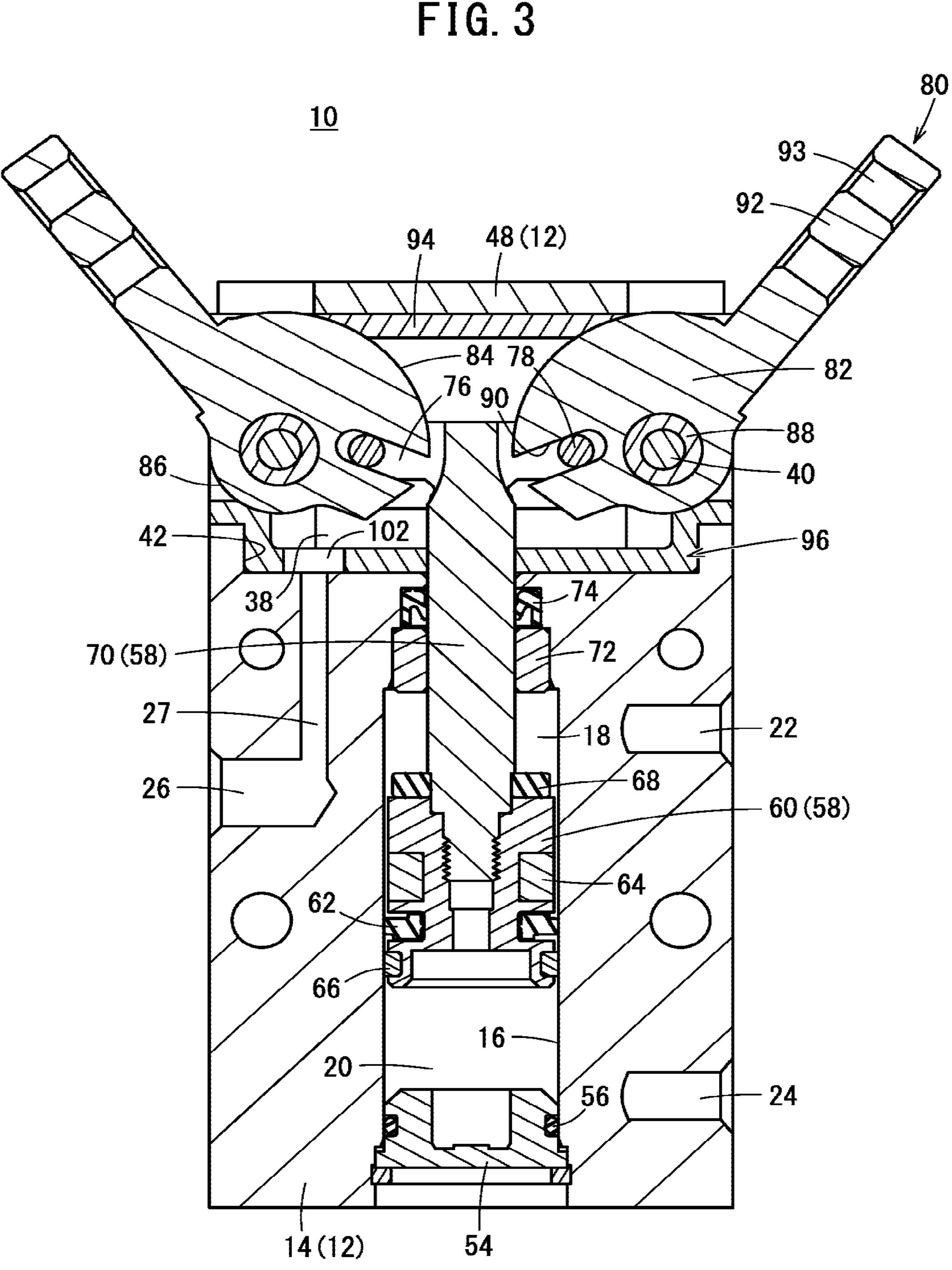
FIG. 3 is a cross-sectional view taken along line III-III of FIG. 2.
Figure 4:
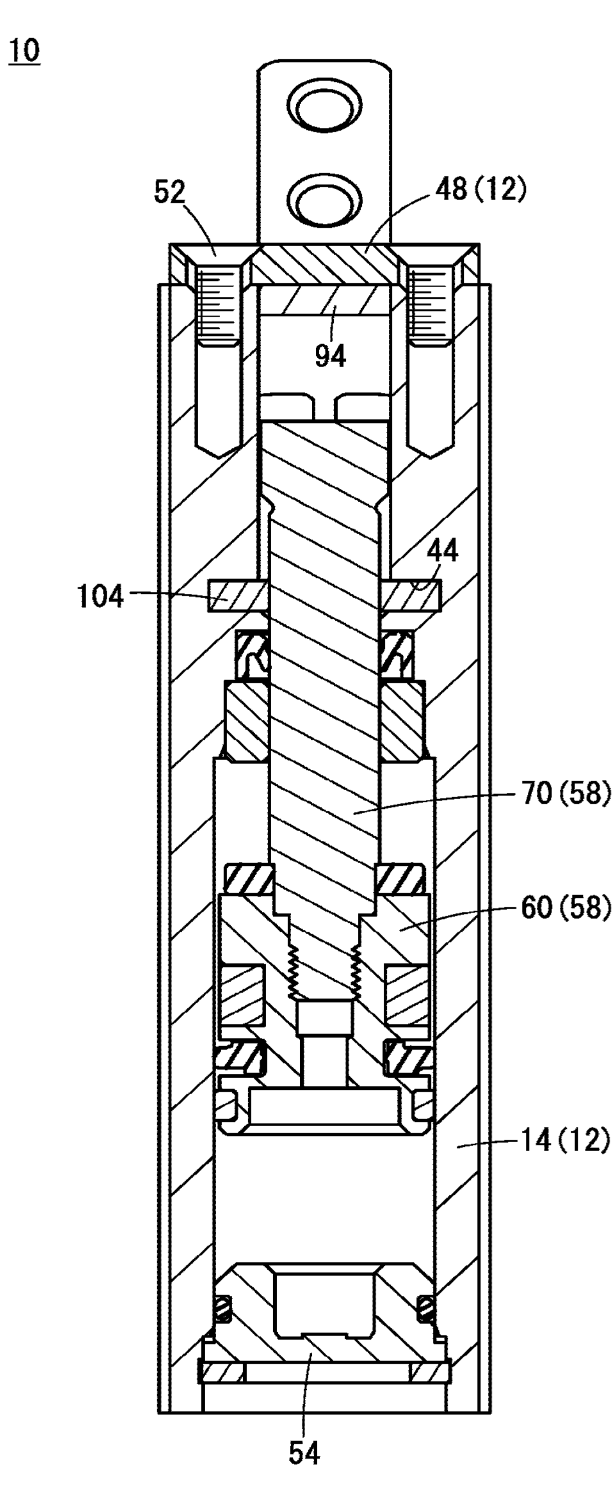
FIG. 4 is a cross-sectional view taken along line IV-IV of FIG. 2.

As shown in FIG. 3, the second porous body 96 is attached to the main body 14 so as to face the second curved surfaces 86 of the pivoting portions 82 of the fingers 80. The main body 14 includes the fitting recess 42 whose bottom surface is a surface where the upper end of the cylinder hole 16 is opened. The second porous body 96 including the stepped portions 106 is fitted into the fitting recess 42 of the main body 14. The main body 14 includes recessed grooves 44 on the inner sides of the pair of wide side surfaces 30, and the projecting portions 104 of the second porous body 96 are fitted into the recessed grooves 44 (see FIG. 4). By the projecting portions 104 of the second porous body 96 being fitted into the recessed grooves 44 of the main body 14, the center of the second porous body 96 is prevented from being lifted by being dragged by the drive rod 70 inserted into the first hole portion 100.

The width W2 of the stepped portions 106 of the second porous body 96 is equal to or slightly larger than the width W0 of the pivoting portions 82 of the fingers 80. In the entire pivot range of the fingers 80, the second curved surfaces 86 of the pivoting portions 82 of the fingers 80 come into contact with corner portions 108 of the stepped portions 106 of the second porous body 96 (see FIG. 3). The portion of the second porous body 96 that comes into contact with each of the second curved surfaces 86 is deformed by being pressed by the second curved surface 86.

Figure 7:
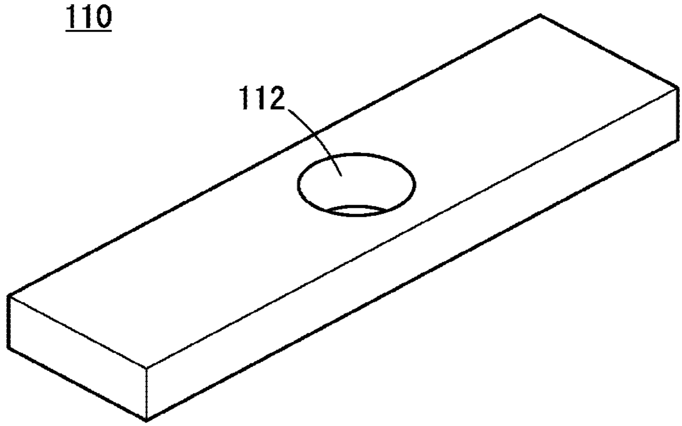
FIG. 7 is a perspective view of a third porous body of the fulcrum opening/closing type air chuck shown in FIG. 1.
Figure 8:
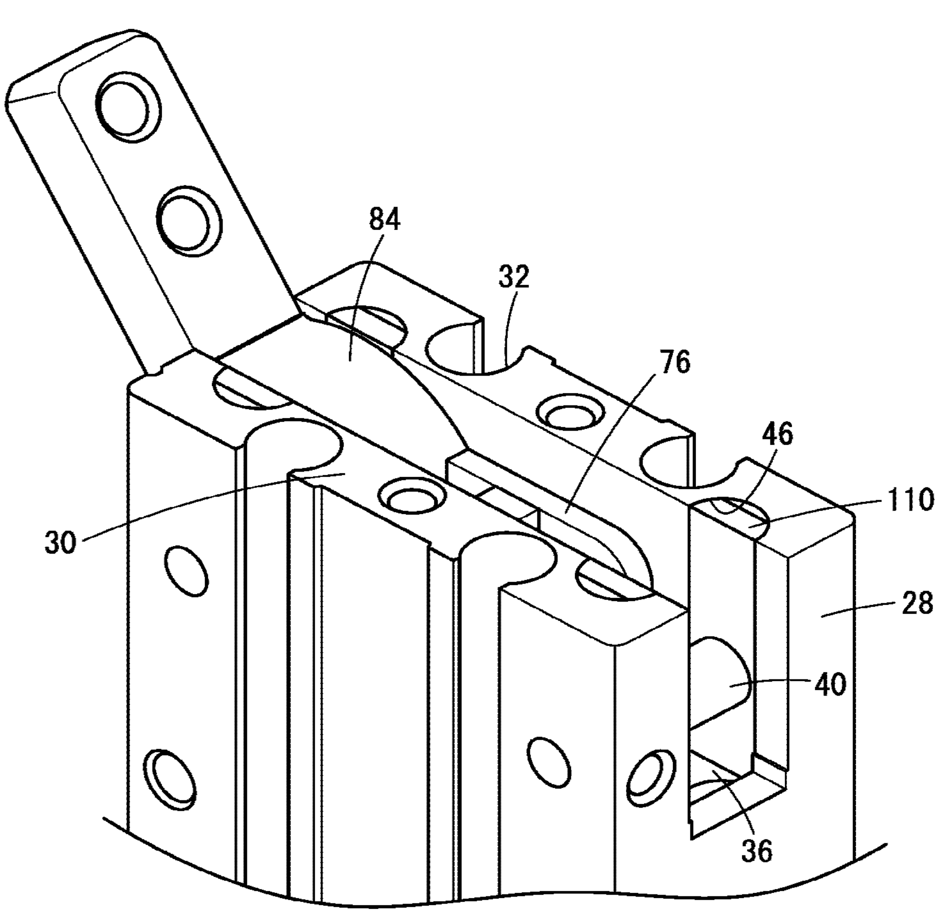
FIG. 8 is a view showing a state in which the third porous bodies of the fulcrum opening/closing type air chuck shown in FIG. 1 are attached.

As shown in FIG. 7, the third porous bodies 110 are formed in an elongated rectangular plate shape. The third porous bodies 110 are attached to the main body 14 so as to face the end surfaces of the pivoting portions 82 of the fingers 80. As shown in FIG. 8, the main body 14 includes fitting grooves 46 on the inner sides of the pair of side walls 28, and the third porous bodies 110 are fitted into the fitting grooves 46. The third porous bodies 110 are disposed at four locations in total, correspondingly to the two end surfaces of the pivoting portion 82 of each finger 80. In the entire pivot range of the fingers 80, the end surfaces of the pivoting portions 82 of the fingers 80 come into surface contact with the third porous bodies 110 at a predetermined pressure. The third porous bodies 110 each include, at the center thereof in the length direction, a hole portion 112 through which the pivot support shaft 40 is inserted.

The main body 14 includes a third port 26 to which purge air is supplied, and a communication passage 27 that allows the third port 26 to communicate with the second hole portion 102 of the second porous body 96 (see FIG. 3). The purge air supplied from the third port 26 passes through the communication passage 27 of the main body 14 and the second hole portion 102 of the second porous body 96, and enters the purge air storage space 38 to increase the pressure in the purge air storage space 38.

Figure 9:
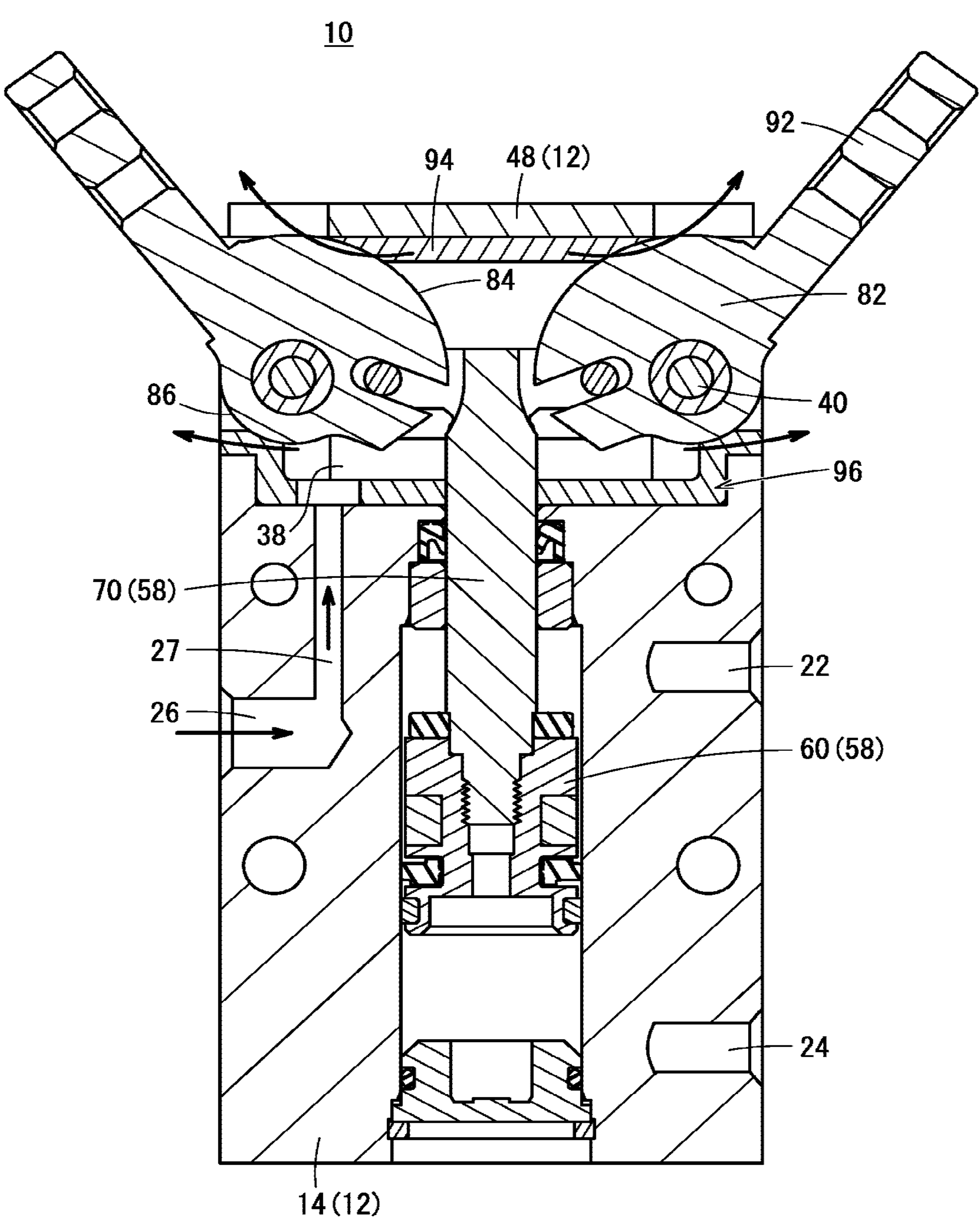
FIG. 9 is a view showing the flow of purge air in the fulcrum opening/closing type air chuck shown in FIG. 1.

The air filling the purge air storage space 38 passes through the interior of the first to third porous bodies 94, 96, and 110, and is then discharged to the outside. At this time, the air passes through the surface of the first porous body 94 exposed to the outside between the end plate 48 and the first curved surface 84 of each of the pivoting portions 82 (see FIGS. 1 and 9). Further, air passes through the surface of the second porous body 96 exposed to the outside between the main body 14 and the second curved surface 86 of each of the pivoting portions 82 (see FIGS. 1 and 9). Furthermore, air passes through the surface of the third porous body 110 exposed to the outside between the main body 14 and the end surface of each of the pivoting portions 82 (see FIG. 1).

Figure 10:
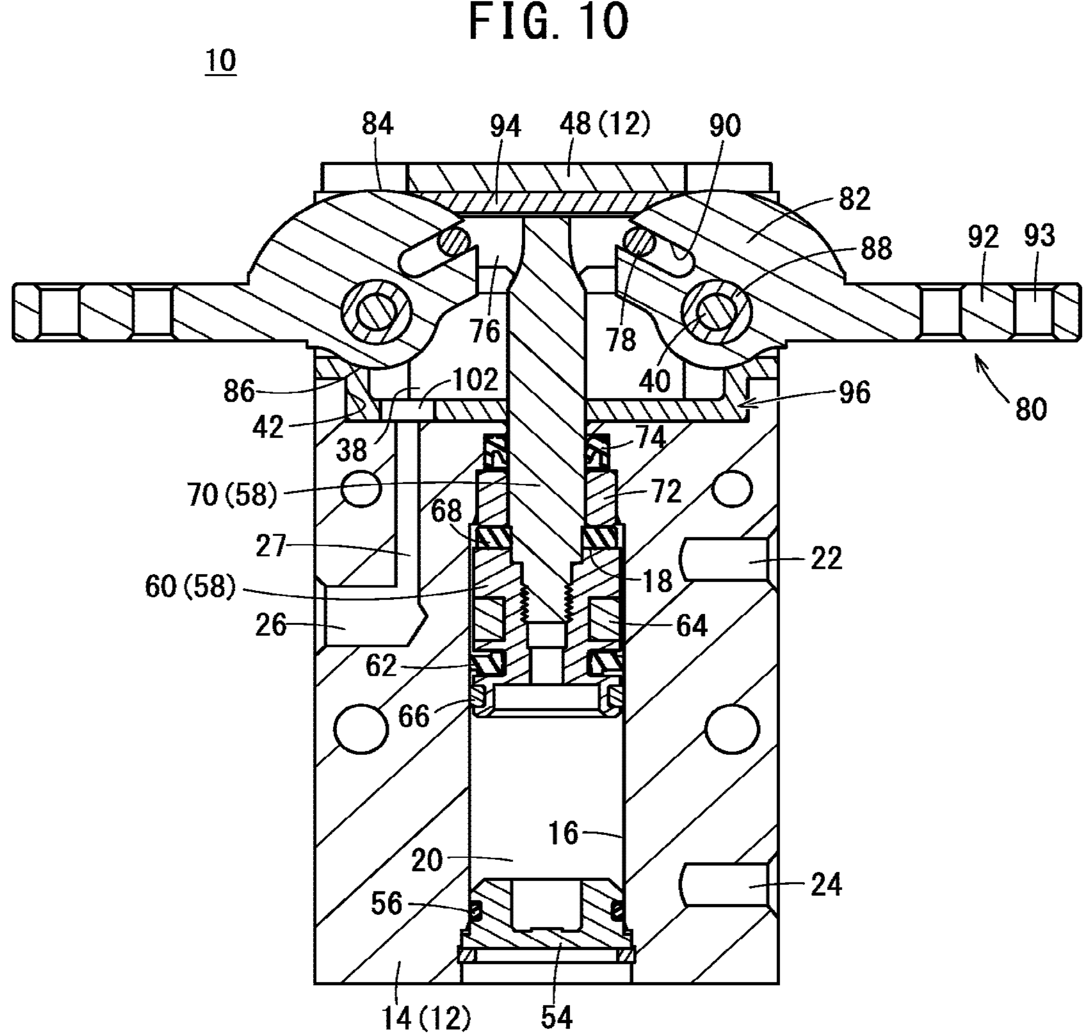
FIG. 10 is a view corresponding to FIG. 3 when a pair of fingers of the fulcrum opening/closing type air chuck shown in FIG. 1 move away from each other.
Figure 11:
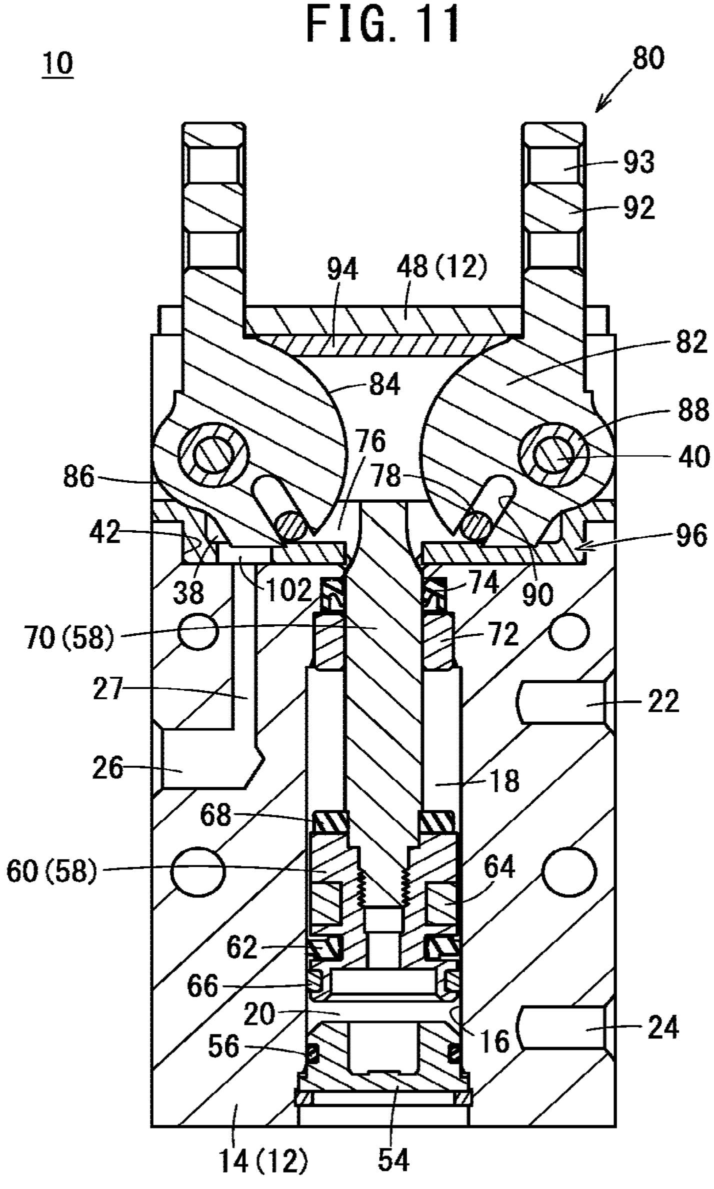
FIG. 11 is a view corresponding to FIG. 3 when the pair of fingers of the fulcrum opening/closing type air chuck shown in FIG. 1 approach each other.

Next, an opening/closing operation of the fulcrum opening/closing type air chuck 10 will be described with reference to FIGS. 10 and 11. The fulcrum opening/closing type air chuck 10 is attached to, for example, a conveyance device that conveys a workpiece. As shown in FIG. 10, a state in which the pair of fingers 80 are aligned in a straight line is defined as an initial state.

The conveyance device (not shown) is driven to convey the fulcrum opening/closing type air chuck 10 to a position where the fulcrum opening/closing type air chuck 10 can grip a workpiece (not shown). Thereafter, a switching valve (not shown) is switched to a predetermined operating position, so that the first port 22 is connected to an air supply source (not shown) and the second port 24 is connected to an exhaust port (not shown). As a result, air is supplied to the first pressure chamber 18, and air in the second pressure chamber 20 is discharged, whereby the piston 60 and the drive rod 70 move downward.

When the drive rod 70 moves downward, the pair of fingers 80 pivot in a direction in which the pair of gripping portions 92 approach each other. The pair of fingers 80 pivot to a position where the pair of gripping portions 92 abut against the end plate 48, whereby the fulcrum opening/closing type air chuck 10 is brought into a closed state (see FIG. 11), and the workpiece is sandwiched between the pair of fingers 80. It should be noted that, according to the shape and size of the workpiece, an attachment member (not shown) can be attached to an attachment hole 93 provided in the gripping portion 92.

The conveyance device is driven again to convey the fulcrum opening/closing type air chuck 10 to a place where the fulcrum opening/closing type air chuck 10 releases the workpiece. Thereafter, the switching valve is switched to another operation position, so that the first port 22 is connected to the exhaust port and the second port 24 is connected to the air supply source. As a result, air is supplied to the second pressure chamber 20, and air in the first pressure chamber 18 is discharged, whereby the piston 60 and the drive rod 70 move upward. When the drive rod 70 moves upward, the pair of fingers 80 pivot in a direction in which the pair of gripping portions 92 move away from each other, and the workpiece is released. The piston 60 moves upward until the damper 68 abuts against the bush 72, and the pair of fingers 80 are again aligned in a straight line (see FIG. 10).

Next, the dust-proof function of the fulcrum opening/closing type air chuck 10 will be described. The purge air storage space 38 is isolated from the outside by the pivoting portions 82 of the fingers 80 and the first to third porous bodies 94, 96, and 110. External dust that is larger than the voids present inside the first to third porous bodies 94, 96, and 110 cannot enter the interior of the first to third porous bodies 94, 96, and 110 as a matter of course. External dust that is smaller than the voids present inside the first to third porous bodies 94, 96, and 110 cannot enter the interior of the first to third porous bodies 94, 96, and 110 by the supply of the purge air. Hereinafter, the dust-proof action by the supply of the purge air will be described.

The third port 26 is constantly connected to an air supply source. That is, the purge air is constantly supplied to the third port 26. The purge air supplied from the third port 26 enters the purge air storage space 38 to increase the pressure in the purge air storage space 38. Then, the air filling the purge air storage space 38 passes through the interior of the first to third porous bodies 94, 96, and 110, and is then discharged to the outside. At this time, the air passes through the surfaces of the first to third porous bodies 94, 96, and 110 exposed to the outside between the body 12 and the pivoting portions 82.

The pressure in the purge air storage space 38 is sufficiently higher than the pressure (atmospheric pressure) on the surfaces of the first to third porous bodies 94, 96, and 110 exposed to the outside. Therefore, external dust that is smaller than the voids present inside the first to third porous bodies 94, 96, and 110 cannot enter the interior of the first to third porous bodies 94, 96, and 110. Even if fine dust enters the interior of the first to third porous bodies 94, 96, and 110, the fine dust is discharged to the outside together with the purge air.

The fulcrum opening/closing type air chuck 10 according to the present embodiment includes the first porous body 94 that is attached to the end plate 48 and comes into contact with the fingers 80. Further, the fulcrum opening/closing type air chuck 10 includes the second porous body 96 and the third porous bodies 110 that are attached to the main body 14 and come into contact with the fingers 80. Furthermore, the purge air passes through the first to third porous bodies 94, 96, and 110 and is discharged to the outside. Therefore, dust can be prevented from entering the interior of the body 12 without increasing the sliding resistance of the fingers 80. By preventing the entry of the dust, durability of the rod packing 74, the piston packing 62, and the like disposed in the cylinder hole 16 is improved.

In the present embodiment, the purge air is constantly supplied, but when the fulcrum opening/closing type air chuck 10 is used in an environment where there is little dust outside, the purge air may be intermittently supplied.

The fulcrum opening/closing type air chuck according to the present invention is not limited to the embodiment described above, and various configurations may be adopted therein without deviating from the essence and gist of the present invention.

What is claimed is:

1. A fulcrum opening/closing type air chuck in which a pair of fingers are each supported so as to be pivotable about a pivot support shaft attached to a body, and a drive unit configured to drive the pair of fingers to move away from each other and approach each other is disposed inside the body, the fulcrum opening/closing type air chuck comprising a porous body attached to the body and configured to come into contact with the fingers, wherein purge air passes through the porous body and is discharged to outside.

2. The fulcrum opening/closing type air chuck according to claim 1, wherein the fingers are each formed of a pivoting portion and a gripping portion, the pivoting portion including a first curved surface and a second curved surface, the body includes a main body and an end plate, and a first porous body configured to come into contact with the first curved surface is attached to the end plate, and a second porous body configured to come into contact with the second curved surface is attached to the main body.

3. The fulcrum opening/closing type air chuck according to claim 2, wherein the second porous body having a rectangular shape includes, at both ends thereof, stepped portions configured to attach the second porous body to the main body by fitting, and the second curved surface comes into contact with corner portions of the stepped portions of the second porous body.

4. The fulcrum opening/closing type air chuck according to claim 2, wherein the second porous body includes a hole portion serving as a passage of purge air.

5. The fulcrum opening/closing type air chuck according to claim 2, wherein the drive unit includes a drive rod coupled to a piston, and the second porous body includes a hole portion through which the drive rod is inserted.

6. The fulcrum opening/closing type air chuck according to claim 2, wherein the pivoting portions each include an end surface perpendicular to an axis of the pivot support shaft, and a third porous body configured to come into contact with the end surface of each of the pivoting portions is attached to the main body.

7. The fulcrum opening/closing type air chuck according to claim 6, wherein the third porous body includes a hole portion through which the pivot support shaft is inserted.

* * * * *